United States Patent [19]
Jain et al.

[11] Patent Number: 6,151,034
[45] Date of Patent: *Nov. 21, 2000

[54] GRAPHICS HARDWARE ACCELERATION METHOD, COMPUTER PROGRAM, AND SYSTEM

[75] Inventors: Rajiv Jain; E. U. Sudhakaran, both of San Jose, Calif.

[73] Assignee: Object Technology Licensinc Corporation, Cupertino, Calif.

[*] Notice: This patent is subject to a terminal disclaimer.

[21] Appl. No.: 09/336,908

[22] Filed: Jun. 21, 1999

Related U.S. Application Data

[63] Continuation of application No. 08/884,285, Jun. 27, 1997, Pat. No. 5,936,641.

[51] Int. Cl.⁷ .................................................... G06F 15/16
[52] U.S. Cl. ........................ 345/503; 345/509; 345/515
[58] Field of Search ................................. 345/501–503, 345/523–525, 507–509, 511, 515, 516

[56] References Cited

U.S. PATENT DOCUMENTS

| | | | |
|---|---|---|---|
| 5,249,067 | 9/1993 | Hirosawa | 358/456 |
| 5,428,722 | 6/1995 | Marsh et al. | 395/133 |
| 5,502,808 | 3/1996 | Goddard et al. | 395/501 |
| 5,764,964 | 6/1998 | Dwin et al. | 345/509 |
| 5,936,641 | 8/1999 | Jain et al. | 345/503 |

*Primary Examiner*—Kee M. Tung
*Attorney, Agent, or Firm*—Kudirka & Jobse, LLP

[57] ABSTRACT

A graphics system enables an automatic choice between existing host rendering programs, existing hardware acceleration methods, and enhanced software acceleration programs for rendering graphic primitives. The graphics system accesses the speed and accuracy characterizations of a hardware accelerator attached to the system. Then, for each graphics primitive available from the enhanced software acceleration programs, the graphics system invention compares the speed and accuracy of the attached hardware accelerator with that of the enhanced software acceleration programs. The graphics system invention then selects which graphics primitives should be rendered by the enhanced software acceleration programs and which graphics primitives should be rendered by the attached hardware accelerator.

41 Claims, 3 Drawing Sheets

GRAPHICS HARDWARE ACCELERATION METHOD, COMPUTER PROGRAM, AND SYSTEM

This is a continuation of application Ser. No. 08/884,285 filed on Jun. 27, 1997 now U.S. Pat. No. 5,936,641.

FIELD OF THE INVENTION

The invention broadly relates to data processing systems, computer programs, and methods and more particularly relates to managing the automatic selection of graphics acceleration techniques.

BACKGROUND OF THE INVENTION

Related Patents

The invention disclosed herein is related to the invention described in U.S. Pat. No. 5,428,722 by Marsh et al. entitled "Object Oriented Painter Maker", assigned to the same assignee as the invention disclosed herein and incorporated herein by reference.

The invention disclosed herein is related to the invention described in U.S. Pat. No. 5,455,599 by Cabral et al. entitled "Object Oriented Graphic System", assigned to the same assignee as the invention disclosed herein and incorporated herein by reference.

Popular window-type operating systems usually include built-in rendering programs to build the images of graphics primitives for display. The graphics primitives are laid out or rendered in a buffer memory prior to being displayed. There are several options for building an image. A partition in the main memory address space can be allocated as the buffer for rendering a graphic image. The buffer may be an on-screen video memory that displays the graphic while it is being built. Or, the buffer may be of an off screen memory partition that will be swapped into the on-screen video memory partition when it is time to display the graphic. Still further, the buffer may be in a different address space serving as either an on-screen memory or an off screen memory. Direct memory access techniques are employed to exchange data between the main memory and such a buffer.

Hardware accelerators using a customized hardware logic device or a co-processor can improve the performance of a graphics system by implementing graphics operations within the device or co-processor. The hardware accelerator usually is controlled by the host operating system program through a driver program. Host operating systems typically initialize by performing a survey of the hardware that is attached to the system when the system is powered on. A hardware driver table is compiled in the system memory identifying the attached hardware and the associated driver programs. Some operating systems will expand the characterization of hardware graphic accelerators by entering performance characterizations of the attached hardware. Speed and accuracy characterizations can be stored for the various graphic rendering operations available from a particular hardware accelerator. The host operating system will compare the speed and accuracy of the attached hardware accelerator with that of the host rendering programs that are included with the host operating system. This is done for each graphic primitive available in the hardware. The host operating system then decides which graphics primitives should be rendered by the host graphics rendering programs and which by the attached hardware accelerator. Then, when applications call for the drawing of a particular graphic primitive, it is the host operating system that controls whether the hardware accelerator is selected or whether the host rendering program is selected to render it in the video memory.

There are a large number of hardware accelerators currently available. These accelerators speed the rendering of graphics operations by using dedicated hardware logic or co-processors, with little host processor interaction. Hardware accelerators can be simple accelerators or complex co-processors. Simple accelerators typically accelerate rendering operations such as line drawing, filling, bit block transfers, cursors, 3D polygons, etc. Co-processors in addition to rendering accelerations, enable multiprocessing, allowing the co-processor to handle some time consuming operations.

Capabilities of graphics accelerators regarding the support of graphics functions and how graphics functions are performed vary from hardware to hardware. Common graphics capabilities supported by currently available 2D hardware accelerators are: Block Transfer (BitBlt), 2D primitives such as Line, Curve, Rectangle, Polygon, Small Circle, etc., Rectangle and Polygon filling/painting (Solid & Pattern), Clipping, Scrolling (Panning), Cursors, Line Drawing, Color Expansion, Mixing, and Masking. Common graphics capabilities supported by currently available 3D hardware accelerators are: 3D primitives such as Curves, Polygons, etc., Z buffer, Smooth shading, Texture mapping, Alpha blending, and Color Dithering. Other useful graphics acceleration features commonly supported are Wide or Styled borders and Double buffer.

A problem with current operating systems is that they do not provide for enhanced software graphics acceleration methods that become available. Ongoing research on the algorithms for rendering graphics primitives provides a continuing source of improved methods that are more accurate than either the existing host rendering programs or the existing hardware acceleration methods. What is needed is a graphics system that enables an automatic choice between existing host rendering programs, existing hardware acceleration methods, and enhanced software acceleration of the rendering process.

SUMMARY OF THE INVENTION

A graphics system invention is disclosed, that enables an automatic choice between existing host rendering programs, existing hardware acceleration methods, and enhanced software acceleration methods for rendering graphic primitives. The graphics system invention is used in a computer system that has a host operating system that includes built-in rendering programs to build the images of graphics primitives for display. The graphics primitives are laid out or rendered in a buffer memory for display by the computer. The computer system within which the graphics system invention is applied, has a hardware accelerator that uses customized hardware logic device or a co-processor to improve the performance of rendering at least some portion of the graphics primitives otherwise handled by the host rendering programs. The hardware accelerator is controlled by the host operating system program through a driver program. The host operating system initializes itself by compiling a hardware driver table in the system memory identifying the attached hardware and the associated driver programs. The host operating system stores speed and accuracy characterizations in the table, of the various graphic rendering operations available from the hardware accelerator.

Enhanced software acceleration programs are present with the graphics system invention in the computer. In accordance with the invention, the graphics system accesses the speed and accuracy characterizations stored in the hardware driver table. Then, for each graphics primitive available from the enhanced software acceleration programs, the graphics system invention compares the speed and accuracy of the attached hardware accelerator with that of the enhanced software acceleration programs. The graphics system invention then selects which graphics primitives should be rendered by the enhanced software acceleration programs and which graphics primitives should be rendered by the attached hardware accelerator. The choice is then stored in a hardware/software acceleration selection table.

Further, in accordance with the invention, when applications call for the drawing of a particular graphic primitive, a rendering request program in the graphics system invention prepares a request for rendering the graphic. The request is passed through the hardware/software acceleration selection table to determine whether the enhanced software acceleration programs have been chosen. If they are, then the rendering request is sent to the enhanced software acceleration programs. Alternately, if the table indicates that the enhanced software acceleration programs have not been chosen, then the rendering request is sent to the host operating system. The host operating system then controls whether the hardware accelerator is selected or whether the host rendering program is selected.

If the enhanced software acceleration programs have been chosen by the graphics system invention, the graphics primitive is rendered in the video memory of the computer. Similarly, if the hardware accelerator has been chosen by the graphics system invention, the graphics primitive is rendered in the same video memory of the computer. In accordance with the invention, the graphics system invention includes an overwrite protection lock table that stores the addresses of regions of the video memory that are reserved. Two classes of overwrite protection reservation can be established. First, the host operating system can establish addresses of regions for graphics reserved for the host operating system, itself. Second, the user can establish a preference for overwrite preemption by the hardware accelerator or overwrite preemption by the enhanced software acceleration programs. Then, when rendering request is passed through the hardware/software acceleration selection table to determine whether the enhanced software acceleration programs have been chosen, the address where the graphic is to be rendered in the video memory is checked in the overwrite protection lock table. If the address has been reserved by either the host operating system or by the user for the hardware accelerator, the rendering request is sent to the host operating system to be handled.

Further, in accordance with the invention, an object oriented program organization is disclosed for the graphics system, to manage the choice between existing host rendering programs, existing hardware acceleration methods, and enhanced software acceleration methods of rendering graphic primitives. The graphics system invention includes a graphics device class (GrafDevice) that forms the superclass of the graphics system invention. A frame buffer class (TFrameBuffer) is a level within the graphics device class that includes the rendering request program. A hardware accelerator frame buffer class (THWAcceleratorFrameBuffer) is a subclass of the frame buffer class that provides methods that are mapped to the hardware accelerator graphics rendering methods. A hardware accelerator class (THWAccelerator) is a subclass of the hardware accelerator frame buffer class that provides methods that support hardware accelerators and that provides a default implementation route back to the rendering request program. A screen class (TDirectAccessScreen) is a subclass of the hardware accelerator class that allows rendering directly to the on-screen video memory. Platform specific classes (TFirstOpSysScreen, TSecondOpSysScreen, and Mscreen) are subclasses of the screen class. For specific host operating systems, these classes determine the acceleration capabilities of the hardware accelerator and route the rendering request to either the hardware accelerator via the host operating system or alternately, to the enhanced software acceleration programs associated with the graphics system.

The resulting invention solves the problem with current systems, of providing enhanced software graphics acceleration methods that are not otherwise provided by the host operating system or the hardware accelerator. The invention enables the automatic choice of algorithms for rendering graphics primitives that are more accurate or faster than either the existing host rendering programs or the existing hardware acceleration methods. The invention provides a graphics system that enables an automatic choice between existing host rendering programs, existing hardware acceleration methods, and enhanced software acceleration of the rendering process.

DESCRIPTION OF THE FIGURES

The invention can be more fully appreciated with reference to the accompanying figures.

DISCUSSION OF THE PREFERRED EMBODIMENT

Figure 1:
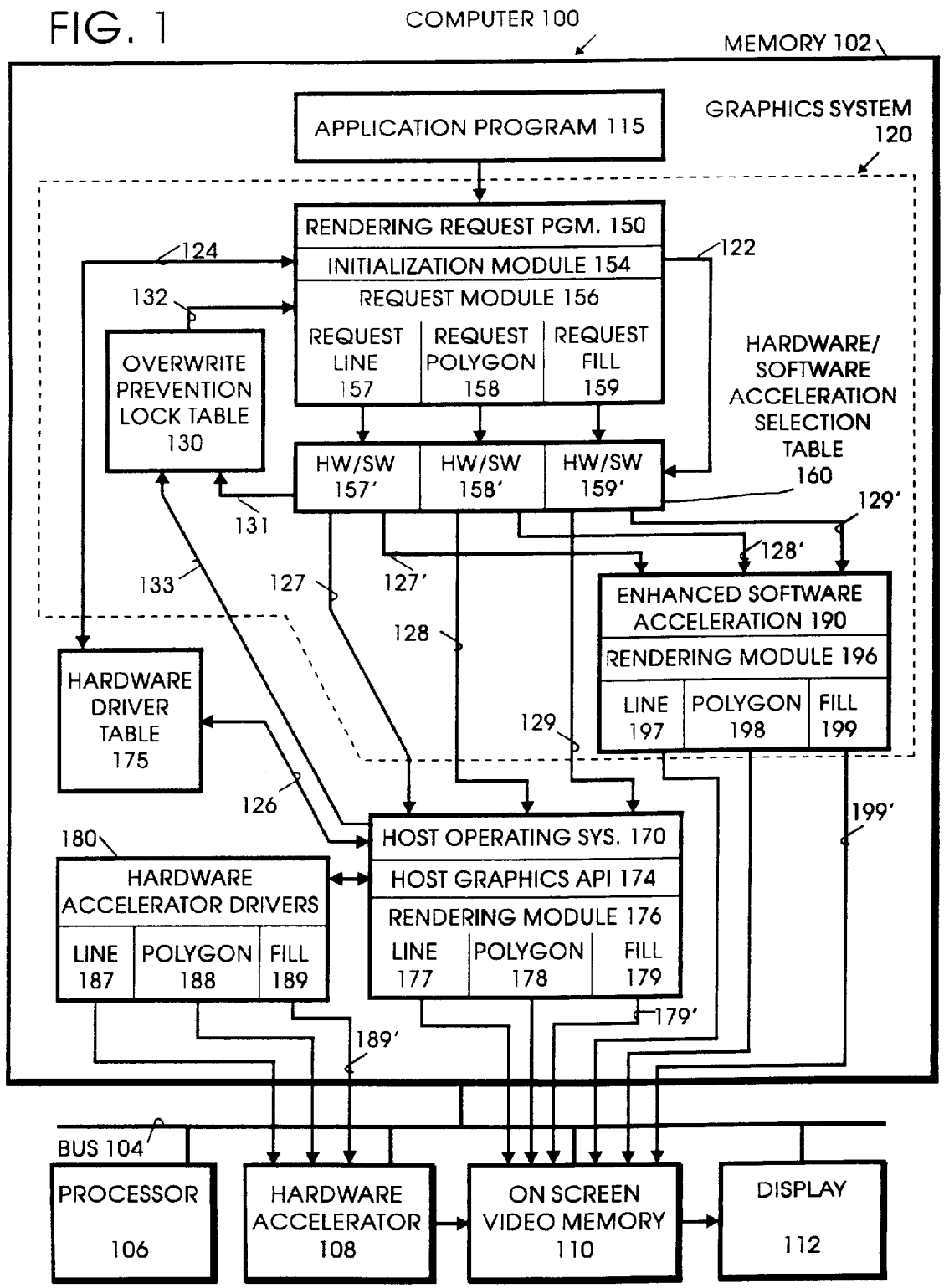
FIG. 1 is an architectural diagram of a computer that includes the graphics system, in accordance with the invention.

FIG. 1 is an architectural diagram of a computer that includes the graphics system in accordance with the invention. The graphics system 120 is stored in the memory 102 of the computer 100 shown in FIG. 1. The graphics system 120 enables an automatic choice between existing host rendering programs, existing hardware acceleration methods, and enhanced software acceleration methods for rendering graphic primitives. The computer 100 of FIG. 1 connects the memory 102 by means of the bus 104 to the processor 106, the hardware accelerator 108, the on-screen video memory 110, and the display 112. The programs and data stored in the memory 102 are processed by the processor 106. The memory 102 stores an application program 115, that makes calls to the graphics system 120 to draw specified graphics primitives on the display 112.

The memory 102 stores a host operating system 170 that includes a rendering module 176 with built-in rendering programs 177, 178 and 179 to build the images of graphics primitives such as a line, a polygon, or a filled area, respectively, for display. For example, built-in rendering program 179 builds the image of a filled area over line 179', in the video memory 110 for display. The graphics primitives produced thereby are laid out or rendered in a buffer memory 110 for display on the display device 112 by the computer. The computer 100 includes a hardware accelerator 108 that uses customized hardware logic device or a co-processor to improve the performance of rendering at least some portion of the graphics primitives otherwise handled by the host rendering programs 177, 178 and 179. The hardware accelerator 108 is controlled by the host operating system program 170 and its host graphics application program interface (API) 174 through a driver program 180. The driver program 180 includes an acceleration method 187 for rendering a line, an acceleration method 188 for rendering a polygon, and an acceleration method 189 for rendering a filled area over line 189'. The graphics primitives produced thereby are laid out or rendered in the buffer memory 110 for display on the display device 112. The memory 102 stores the enhanced software acceleration program 190 which accompanies the graphics system 120. The enhanced software acceleration program 190 includes a rendering module 196 with enhanced software acceleration programs 197, 198 and 199 to build the images of graphics primitives such as a line, a polygon, or a filled area, respectively, for display. The graphics primitives produced thereby are laid out or rendered in the buffer memory 110 for display on the display device 112.

The host operating system 170 initializes itself by compiling a hardware driver table 175 in the system memory 102 identifying the attached hardware 108 and the associated driver 180 programs 187, 188, and 189. The host operating system 170 stores speed and accuracy characterizations in the table 175, of the various graphic rendering operations 187, 188, and 189 available from the hardware accelerator 108.

Enhanced software acceleration programs 197, 198, and 199 are present in the rendering module 196 of the enhanced software acceleration program 190 in the graphics system 120. In accordance with the invention, the graphics system 120 has its initialization module 154 access the speed and accuracy characterizations of the hardware accelerator 108 that are stored in the hardware driver table 175. Then, for each graphics primitive line, polygon, and filled area available from the enhanced software acceleration programs 197, 198, and 199, the graphics system initialization module 154 compares the speed and accuracy characteristics of the attached hardware accelerator 108 with those of the enhanced software acceleration programs 197, 198, and 199. The graphics system initialization module 154 then selects which graphics primitives should be rendered by the enhanced software acceleration programs and which graphics primitives should be rendered by the attached hardware accelerator. For example, hardware accelerator method 187 is selected by initialization module 156 for rendering-the line and hardware accelerator method 188 is selected for rendering the polygon. The enhanced software acceleration program 199 is selected by initialization module 156 for rendering the filled area graphic primitive.

These selections are then stored over line 122 into the hardware/software acceleration selection table 160. For example, the selection of the hardware accelerator method 187 for a line is stored in location 157' of table 160. A request 157 for rendering a line from the request module 156 would result in directing the request over line 127 instead of 127', to the host operating system 170 that controls the hardware accelerator driver program 187 which will render a line. The selection of the hardware accelerator method 188 for a polygon is stored in location 158' of table 160. A request 158 for rendering a polygon from the request module 156 would result in directing the request over line 128 instead of 128', to the host operating system 170 that controls the hardware accelerator driver program 188 which will render a polygon. The selection of the enhanced software acceleration program 199 to fill an area, is stored in location 159' of table 160. A request 159 for rendering a filled area from the request module 156 would result in directing the request over line 129' to the enhanced software acceleration program 199 which will render a filled area graphic primitive.

Further, in accordance with the invention, when application program 115 calls for the drawing of a particular graphic primitive, the rendering request module 156 in the rendering request program 150 of the graphics system 120, prepares a request 157, 158, or 159 for rendering the graphic. The request 157, 158, or 159 is passed through the hardware/software acceleration selection table 160 to determine whether the enhanced software acceleration programs 190 have been chosen. If they are, then the rendering request 157, 158, or 159 is sent to the enhanced software acceleration programs 190.

Alternately, if the hardware/software acceleration selection table 160 indicates that the enhanced software acceleration programs 190 have not been chosen, then the rendering request 157, 158, or 159 is sent to the host operating system 170. The host operating system 170 then controls whether the hardware accelerator 108 is selected or whether the host rendering program 177, 178, or 179 in the host rendering module is selected.

If the enhanced software acceleration programs 190 have been chosen by the graphics system 120, the graphics primitive is rendered by program 197, 198, or 199 in the video memory 110 of the computer. Similarly, if the hardware accelerator 108 has been chosen by the graphics system 120, the graphics primitive is rendered in the same video memory 110 of the computer. In accordance with the invention, the graphics system 120 includes an overwrite protection lock table 130 that stores the addresses of regions of the video memory 110 that are reserved. Two classes of overwrite protection reservation can be established. First, the host operating system 170 can establish over line 133, the addresses of regions for graphics reserved for the host operating system 170, itself. Second, the user can establish over line 133, a preference for overwrite preemption by the hardware accelerator 108 or a preference for overwrite preemption by the enhanced software acceleration programs 190. Then, when rendering request 157, 158, or 159 is passed through the hardware/software acceleration selection table 160 to determine whether the enhanced software acceleration programs 190 have been chosen, the address where the graphic is to be rendered in the video memory 110 is passed over line 131 to be checked in the overwrite protection lock table 130. If the address has been reserved by either the host operating system 170 or by the user for the hardware accelerator 108, a signal is passed over line 132 to the request module 156 to divert the rendering request to the host operating system 170 to be handled. An example of this result is shown in FIG. 3.

Figure 3:
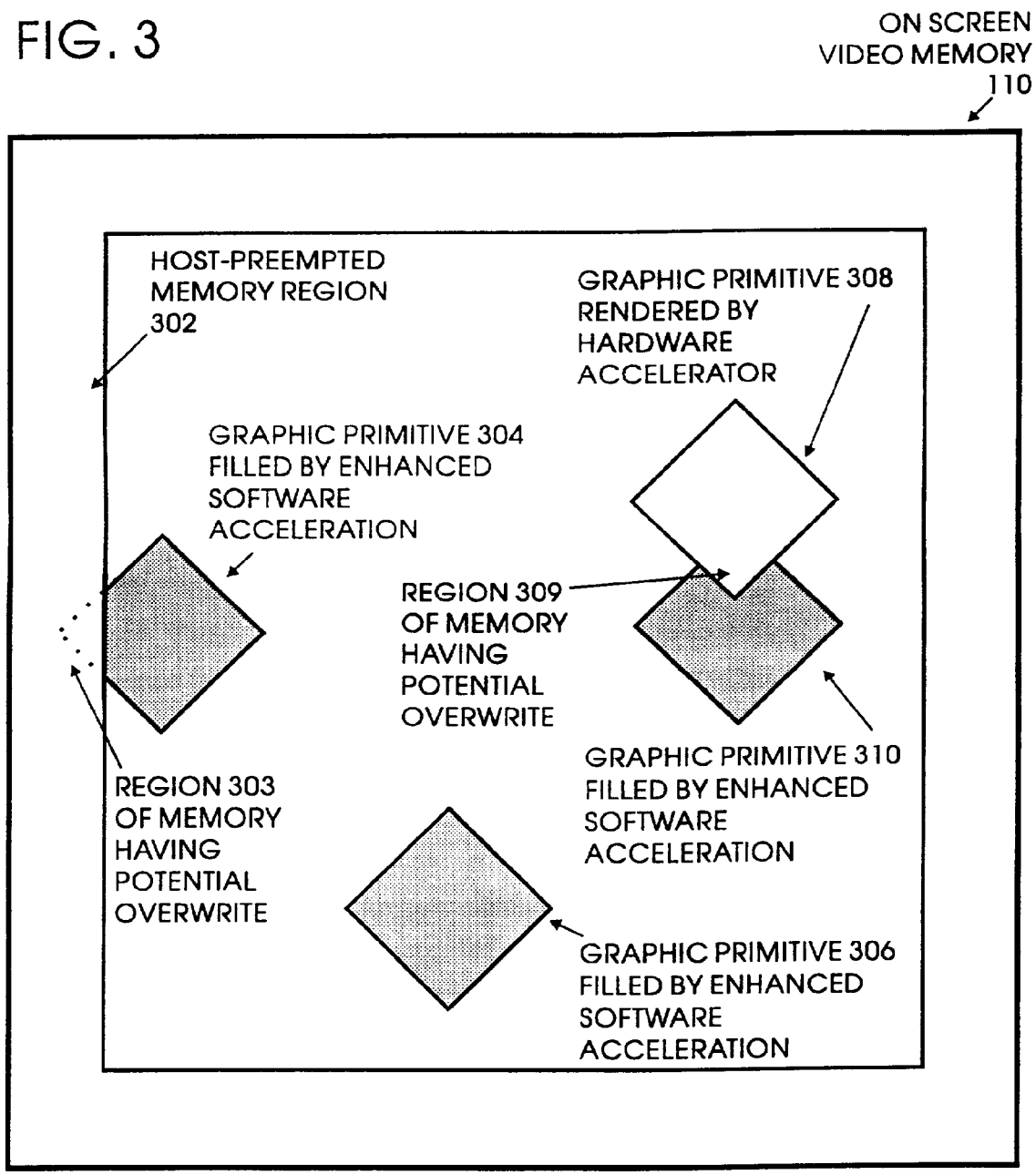
FIG. 3 illustrates the on-screen video memory of the computer of FIG. 1, showing example regions of the memory having a potential overwrite problem, which is solved by the invention.

Reference to FIG. 3 illustrates the on-screen video memory 110 of the computer of FIG. 1, showing the regions 303 and 309 of memory having potential overwrite. In the example of FIG. 3, a rendering request 159 is made by request module 156 to render the filled area graphic primitive 304 which will overlap the host preempted memory region 302 in the region 303. In accordance with the invention, since the address of region 303 has been reserved by the host operating system 170, a signal is passed over line 132 to the request module 156 to divert the rendering request 159 over line 129 to the host operating system 170 to be handled. In another example of FIG. 3, a rendering request 159 is made by request module 156 to render the filled area graphic primitive 310 which will overlap at region 309 the graphic primitive polygon 308 rendered by the acceleration hardware 108. The user has selected the preference for the hardware accelerator 108 to have a reservation for regions of memory 110 that are occupied by graphics primitives that the hardware 108 renders, such as region 309. In accordance with the invention, since the address of region 309 has been reserved by the hardware accelerator 108, a signal is passed over line 132 to the request module 156 to divert the rendering request 159 over line 129 to the host operating system 170 to be handled. In another example of FIG. 3, a rendering request 159 is made by request module 156 to render the filled area graphic primitive 306. When rendering request 159 is passed through the hardware/software acceleration selection table 160 to determine whether the enhanced software acceleration programs 190 have been chosen, the address where the graphic 306 is to be rendered in the video memory 110 is passed over line 131 to be checked in the overwrite protection lock table 130. Since the address has not been reserved by either the host operating system 170 or by the user for the hardware accelerator 108, the rendering request 159 is passed over line 129' to the enhanced software acceleration program 199 for rendering over line 199'.

Figure 2:
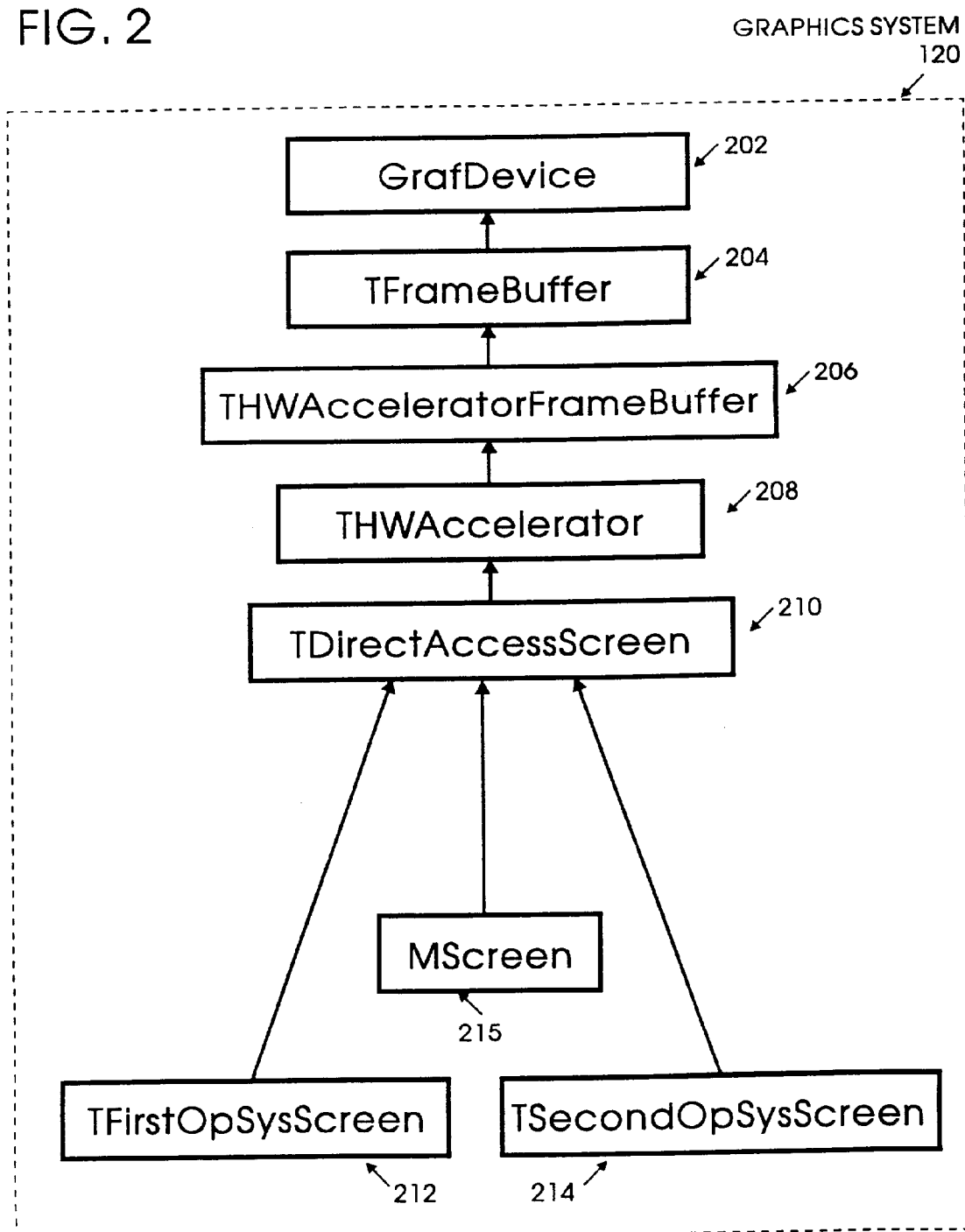
FIG. 2 is a Booch diagram illustrating the relationship between the object oriented classes that make up the graphics system, in accordance with the invention.

FIG. 2 is a Booch diagram illustrating the relationship between the object oriented classes that make up the graphics system 120, in accordance with the invention. The object oriented program organization manages the choice between existing host rendering programs, existing hardware acceleration methods, and enhanced software acceleration methods of rendering graphic primitives. The graphics system 120 includes a graphics device class 202 (GrafDevice) that forms the superclass of the graphics system invention. The graphics device class 202 (GrafDevice) is described in the above referenced U.S. Pat. No. 5,455,599; A. W. Cabral, R. Jain, et al. "Object Oriented Graphic System". This patent, which is incorporated herein by reference, discloses several graphic devices, such as a graphic accelerator and a frame buffer of a raster display, to output graphic information in response to an application program. The message output by the application program is the same for both output devices. The way that a shape is drawn by a graphics accelerator is different from the way it is drawn by a frame buffer/raster display. A graphic port stores the state of the system, including which output device is to be used. The information specifying how each respective output device is to be controlled to draw a shape is stored in the device objects, collectively shown as the polymorphic graphic device objects. There is one device object for each output device. The graphics device class 202 (GrafDevice) is also described in the above referenced U.S. Pat. No. 5,428,722 Marsh, et al. "Object Oriented Painter Maker". This patent, which is incorporated by reference, discloses acceleration of graphical rendering process by adaptive selection of painting algorithms based on optimum use of particular type of rendering hardware.

FIG. 2 shows a frame buffer class (TFrameBuffer) which is a level within the graphics device class that includes the rendering request program. A hardware accelerator frame buffer class (THWAcceleratorFrameBuffer) is a subclass of the frame buffer class that provides methods that are mapped to the hardware accelerator graphics rendering methods. A hardware accelerator class (THWAccelerator) is a subclass of the hardware accelerator frame buffer class that provides methods that support hardware accelerators and that provides a default implementation route back to the rendering request program. A screen class (TDirectAccessScreen) is a subclass of the hardware accelerator class that allows rendering directly to the on-screen video memory. Platform specific classes (TFirstOpSysScreen, TSecondOpSysScreen, and Mscreen) are subclasses of the screen class. For specific host operating systems, these classes determine the acceleration capabilities of the hardware accelerator and route the rendering request to either the hardware accelerator via the host operating system or alternately, to the enhanced software acceleration programs associated with the graphics system.

GrafDevice 202 provides interfaces concerned with the specific rendering primitives such as lines, rectangles, polygons, etc. GrafDevice 202 provides a RenderX( . . . ) method for each graphics primitive. It is desirable to override the RenderX( . . . ) method for the primitive of interest to exploit hardware acceleration. If the underlying hardware is capable of rendering a primitive, the RenderX( . . . ) methods corresponding to that primitive override and are implemented using the graphical capabilities of the hardware.

The support for hardware acceleration is provided at the GrafDevice 202 level, specifically at TFrameBuffer level 204. To support hardware acceleration, two classes are provided, THWAcceleratorFrameBuffer 206 and THWAccelerator 208. THWAcceleratorFrameBuffer 206 is a subclass of TFrameBuffer 204 and it provides methods that are easily mapped to hardware graphics functions. THWAccelerator 208 is a subclass of THWAcceleratorFrameBuffer 208 and it provides methods that are relevant to hardware accelerators such as 108 and its default implementation routes the rendering requests 157, 158, and 159 back to Graphics system rendering request program 150. Platform specific derived classes of THWAccelerator 208 may override the parent methods to use the hardware accelerator 108 or the host graphics programs 177, 178, and 179 to perform the graphics operation. Platform specific derived classes (such as TFirstOpSysScreen 212) determine the acceleration capabilities of the underlying hardware 108 and route the rendering request either to the hardware 108 or to the enhanced software acceleration program 190 of the Graphics system. If a particular graphics operation can be performed by the hardware 108 meeting Graphics system requirements, that operation may be routed to the hardware 108. If the hardware 108 is not capable of performing a graphics operation satisfying Graphics system requirements, that rendering request will be routed back to enhanced software acceleration program 190 of the Graphics system by calling the corresponding method of the parent (THWAcceleratorFrameBuffer 206) class.

Platform specific subclasses of THWAccelerator 208 typically implements its methods using host graphics API 174 interfaces (such as GDI in Win32, GPI in OS2, etc.). Host graphics APIs 174 are typically optimized to use acceleration features of the underlying hardware 108. Typically host graphics APIs 174 initially query the device driver 187, 188, or 189 and if the hardware device 108 is capable of performing a graphics operation, it lets the device 108 perform that operation by routing the call directly to the driver 187, 188, or 189. Using the host graphics API 174 interfaces provided by the host operating system 170 eliminates synchronization problems involved in screen access by Graphics system 120 and host system 170, simultaneously.

In order to mix hardware 108 rendering and Graphics system's 120 software rendering while performing graphics operations, direct rendering is performed to the on-screen video memory 110. TDirectAccessScreen 210 represents a screen class that allows rendering directly to the on-screen video memory 110. Platform specific classes such as TFirstOpSysScreen 212 and TSecondOpSysScreen 214 derive from TDirectAccessScreen 210 to get screen and hardware accelerator functionalities.

In order to support hardware acceleration, it is required to determine the acceleration capabilities of the underlying graphics hardware. For example, in Win32, the GDI can be probed to determine the acceleration capabilities of the underlying hardware.

Operating systems such as Windows 3.1, Windows 95 and OS2 provide mechanisms to access the on-screen video memory in a device independent way. Windows 3.1provides an interface called DCI (Display Control Interface) and Windows 95 provides an interface called Direct Draw which allow the applications to access the on-screen video memory in a device independent way. OS2 provides an interface called DIVE (Direct Interface Video Extension) which allows the applications to directly access the on-screen video memory.

The resulting invention solves the problem with current systems, of providing enhanced software graphics acceleration methods that are not otherwise provided by the host operating system or the hardware accelerator. The invention enables the automatic selection of algorithms for rendering graphics primitives that are more accurate than either the existing host rendering programs or the existing hardware acceleration methods. The invention provides a graphics system that enables an automatic choice between existing host rendering programs, existing hardware acceleration methods, and enhanced software acceleration of the rendering process.

Although a specific embodiment of the invention has been disclosed, it will be understood by those having skill in the art that changes can be made to that specific embodiment without departing from the spirit and the scope of the invention.

What is claimed is:

1. A graphics system that enables an automatic choice between rendering a set of graphics primitives by a hardware accelerator controlled by an operating system and rendering the set of graphics primitives by a computer-executable, enhanced rendering program distinct from the operating system, the hardware accelerator comprising a hardware device, the graphics system comprising:
   A) an accessing mechanism for accessing a set of speed and accuracy characterizations of the hardware accelerator and a set of speed and accuracy characterizations of the enhanced rendering program;
   B) a selecting mechanism, coupled with the accessing mechanism and responsive to the speed and accuracy characterizations of the hardware accelerator and the enhanced rendering program, for selecting a first subset of the set of graphics primitives to be rendered by the hardware accelerator and a second subset of the set of graphics primitives to be rendered by the enhanced rendering program; and
   C) a memory, coupled with the selecting mechanism, for storing the selected first and second subsets of the graphics primitives.

2. The graphics system in accordance with claim 1, wherein the operating system enters speed and accuracy characterizations regarding the hardware accelerator in a hardware driver table, the hardware driver table identifying the hardware accelerator and an associated driver program through which the operating system controls the hardware accelerator.

3. The graphics system in accordance with claim 1, wherein the rendering operations include 3D renderings.

4. The graphics system in accordance with claim 1, in combination with a computer system having a processor for executing the operating system and a plurality of computer programs including the enhanced rendering program.

5. The graphics system in accordance with claim 4, wherein the hardware accelerator comprises dedicated hardware logic distinct from the processor.

6. The graphics system in accordance with claim 4, wherein the hardware accelerator comprises a co-processor.

7. The graphics system in accordance with claim 4, wherein the operating system comprises a host rendering program for rendering a plurality of graphics primitives.

8. The graphics system in accordance with claim 7, wherein the graphics primitives are rendered in a buffer memory of the computer system.

9. The graphics system in accordance with claim 7, wherein the hardware accelerator is capable of rendering a set of the plurality of graphics primitives rendered by the host rendering program.

10. The graphics system in accordance with claim 7, further comprising:
    A) a computer-executable rendering request program for generating a rendering request for rendering a graphics primitive specified by the request; and
    B) a determining mechanism, responsive to the rendering request, for accessing an acceleration selection table in determining whether the selection corresponding, in the acceleration selection table, to the graphics primitive specified by the rendering request comprises the enhanced rendering program.

11. The graphics system in accordance with claim 10, wherein the determining mechanism, responsive to a determination, sends the rendering request to the rendering program if the acceleration selection table identifies the enhanced rendering program as corresponding to the graphics primitive specified by the rendering request, and otherwise sends the rendering request to the operating system.

12. The graphics system in accordance with claim 11, wherein, after receiving a rendering request sent by the determining mechanism, the operating system determines whether to cause the hardware accelerator to render the graphics primitive specified by the rendering request.

13. The graphics system in accordance with claim 10,
    A) further comprising a number of computer-executable, enhanced rendering programs for rendering graphics primitive; and
    B) wherein the determining mechanism, responsive to the rendering request, accesses the acceleration selection table for determining which, if any, of the enhanced rendering programs should render the graphics primitive specified by the rendering request.

14. The graphics system in accordance with claim 1, further comprising a rendering request mechanism for receiving a rendering request for rendering a graphics primitive; and wherein the selection mechanism, responsive to the rendering request, compares the stored speed and accuracy characterizations of the hardware accelerator and the enhanced rendering program as indications of acceleration capabilities in selecting one, if any, of the hardware accelerator and the enhanced rendering program for rendering the graphics primitive specified by the request.

15. The graphics system in accordance with claim 1, further comprising a video memory having a plurality of memory regions in which the graphics primitives can be rendered by first and second graphics rendering accelerators, the memory comprising:

A) a first set of addresses of the memory regions for graphics rendering reserved by an operating system for the first graphics rendering accelerator; and B) a second set of addresses of the memory regions for graphics rendering reserved by a user for the second graphics rendering accelerator.

16. The graphics system in accordance with claim 15, wherein the first graphics rendering accelerator comprises the hardware accelerator.

17. The graphics system in accordance with claim 15, wherein the first graphics rendering accelerator comprises a computer-executable host rendering program included in the operating system.

18. The graphics system in accordance with claim 15, further comprising a number of rendering tables including an overwrite protection lock table for storing an indication of which of the addresses of the memory regions are reserved for the first graphics rendering accelerator and which of the addresses of the memory regions are reserved for the first and second graphics rendering accelerators.

19. The combination in accordance with claim 18, wherein the rendering tables further comprise an accelerator selection table, responsive to a graphics primitive rendering request, for storing table for storing an indication of which of the graphics rendering accelerators are to be used for rendering each of a plurality of graphics primitives, the accelerator selection table indications being accessed for selecting whether a graphics primitive specified by the request should be rendered by one of the first and second graphics rendering accelerators.

20. A video memory system for a computer system having a plurality of memory regions in which graphics primitives can be rendered by first and second graphics rendering accelerators, the first graphics rendering accelerator having overwrite preemption over the second graphics rendering accelerator, the memory system comprising:

A) a first set of addresses of the memory regions for graphics rendering reserved by an operating system for the first graphics rendering accelerator;

B) an overwrite protection lock table that stores the first set of addresses; and C) a graphics rendering selector which uses the second graphics rendering accelerator to render graphics primitives into memory regions with addresses that are not in the overwrite protection lock table and which forwards a rendering request to the operating system to use the first graphics rendering accelerator otherwise.

21. The video memory in accordance with claim 20, wherein the first graphics accelerator comprises a computer-executable, host rendering program included in the operating system.

22. The video memory in accordance with claim 20, wherein the first graphics accelerator comprises dedicated hardware logic.

23. The video memory system in accordance with claim 20, further comprising an accelerator selection table, responsive to a graphics primitive rendering request for storing an indication of which of the graphics rendering accelerators are to be used for rendering each of a plurality of graphics primitives, the accelerator selection table indications being accessed for selecting whether a graphics primitive specified by the request should be rendered by one of the first and second graphics rendering accelerators.

24. The video memory system in accordance with claim 20, further comprising an accelerator selection table, responsive to a graphics primitive rendering request for storing an indication of which of the graphics rendering accelerators are to be used for rendering each of a plurality of graphics primitives, the accelerator selection table indications being accessed for selecting whether a graphics primitive specified by the request should be rendered by a third graphics rendering accelerator.

25. The video memory system in accordance with claim 24, wherein, if the third graphics rendering accelerator is not selected, the accelerator selection table passes an address where the graphics primitive specified by the request is to be rendered in the memory to the overwrite protection lock table for use in determining whether the address is reserved for the first graphics rendering accelerator and thus is to be rendered by the first graphics rendering accelerator.

26. The video memory system in accordance with claim 24, where in the third graphics rendering accelerator comprises a computer-executable enhanced rendering program.

27. The video memory system in accordance with claim 26, wherein the computer-executable enhanced rendering program is distinct from a host rendering program included in the operating system.

28. A method for use in a graphics system that enables an automatic choice between rendering a set of graphics primitives by a hardware accelerator controlled by an operating system and rendering the set of graphics primitives by a computer-executable, enhanced rendering program distinct from the operating system, the hardware accelerator comprising a hardware device, the method comprising:

A) accessing a set of speed and accuracy characterizations of the hardware accelerator and a set of speed and accuracy characterizations of the enhanced rendering program;

B) selecting a first subset of the set of graphics primitives to be rendered by the hardware accelerator and a second subset of the set of graphics primitives to be rendered by the enhanced rendering program based on a comparison of the sets of speed and accuracy characterizations; and C) storing the selected first and second subsets of the graphics primitives.

29. The method in accordance with claim 28, further comprising entering, by the operating system, speed and accuracy characterizations regarding the hardware accelerator in a hardware driver table, the hardware driver table identifying the hardware accelerator and associated driver program through which the operating system controls the hardware accelerator.

30. The method in accordance with claim 29, further comprising: the operating system, responsive to a rendering request, determining whether to cause the hardware accelerator to render the graphics primitive specified by the rendering request.

31. The method in accordance with claim 28, as performed by a computer system having a processor for executing the operating system and a plurality of computer programs including the enhanced rendering program, and wherein the hardware accelerator comprises dedicated hardware logic distinct from the processor.

32. The method in accordance with claim 28, wherein the operating system comprises a host rendering program for rendering a plurality of graphics primitives.

33. The method in accordance with claim 32, further comprising:

A) generating a rendering request for rendering a graphics primitive specified in the request; and B) accessing an acceleration selection table in determining whether the selection corresponding, in the acceleration selection table, to the graphics primitive specified by the rendering request comprises the enhanced rendering program.

34. The method in accordance with claim 32, further comprising: sending the rendering request to the rendering program if the acceleration selection table identifies the enhanced rendering program as corresponding to the graphics primitive specified by the rendering request, and otherwise sending the rendering request to the operating system.

35. The method in accordance with claim 28, further comprising:

receiving a rendering request for rendering a graphics primitive; and wherein the selection mechanism, responsive to the rendering request, compares the stored speed and accuracy characterizations of the hardware accelerator and the enhanced rendering program as indications of acceleration capabilities in selecting one, if any, of the hardware accelerator and the enhanced rendering program for rendering the graphics primitive specified by the request.

36. The method in accordance with claim 28, further comprising:

A) providing a video memory having a plurality of memory regions in which graphics primitives can be rendered by first and second graphics rendering accelerators;

B) reserving, by the operating system, a first set of addresses of the memory regions for graphics rendering by the first graphics rendering accelerator; and C) reserving, by a user, a second set of addresses of the memory regions for graphics rendering by the second graphics rendering accelerator.

37. The method in accordance with claim 36, wherein the first graphics rendering accelerator comprises the hardware accelerator.

38. The method in accordance with claim 36, wherein the first graphics rendering accelerator comprises a computer-executable host rendering program included in the operating system.

39. The method in accordance with claim 36, further comprising: storing, in an overwrite protection lock table, an indication of which of the addresses of the memory regions are reserved for the first graphics rendering accelerator and of which of the addresses of the memory regions are reserved for the first and second graphics rendering accelerators.

40. The method in accordance with claim 36, further comprising: storing, in an accelerator selection table, responsive to a graphics primitive rendering request, an indication of which of the graphics rendering accelerators are to be used for rendering each of a plurality of graphics primitives, the accelerator selection table indications being accessed for selecting whether a graphics primitive specified by the request should be rendered by one of the first and second graphics rendering accelerators.

41. A computer program product comprising a computer-executable program embodied on a computer-readable medium for use in a graphics system that enables an automatic choice between rendering a set of graphics primitives by a hardware accelerator controlled by an operating system and rendering the set of graphics primitives by a computer-executable, enhanced rendering program distinct from the operating system, the hardware accelerator comprising a hardware device, the computer-executable program comprising:

A) program code for accessing a set of speed and accuracy characterizations of the hardware accelerator and a set of speed and accuracy characterizations of the enhanced rendering program;

B) program code for selecting a first subset of the set of graphics primitives to be rendered by the hardware accelerator and a second subset of the set of graphics primitives to be rendered by the enhanced rendering program based on a comparison of the sets of speed and accuracy characterizations; and C) program code for causing storage of the selected first and second subsets of the graphics primitives.

* * * * *